July 21, 1953  G. R. COLLINS  2,645,874
FISHERMAN'S LANDING NET
Filed Dec. 4, 1950  2 Sheets-Sheet 1
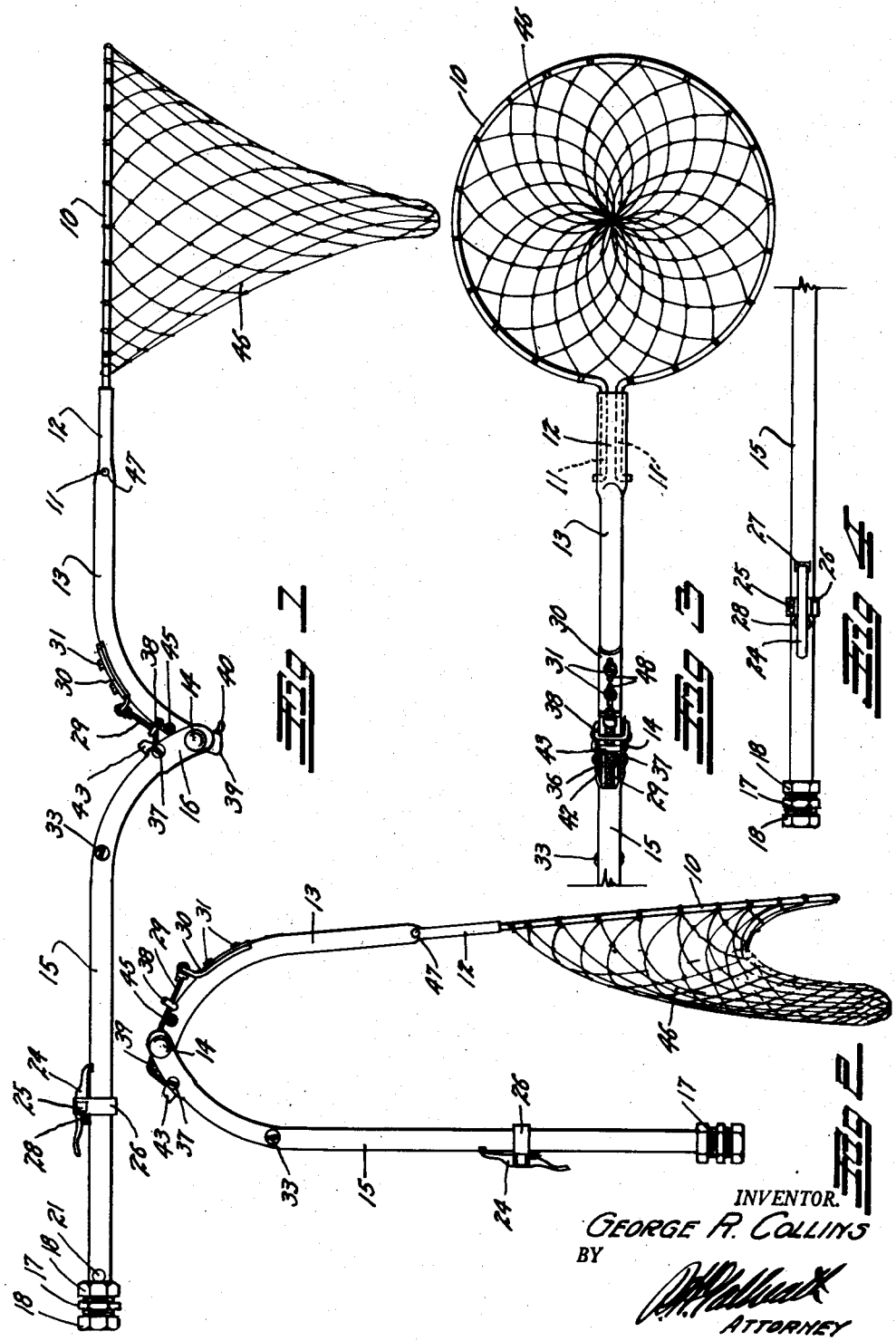
INVENTOR.
GEORGE R. COLLINS
BY
ATTORNEY

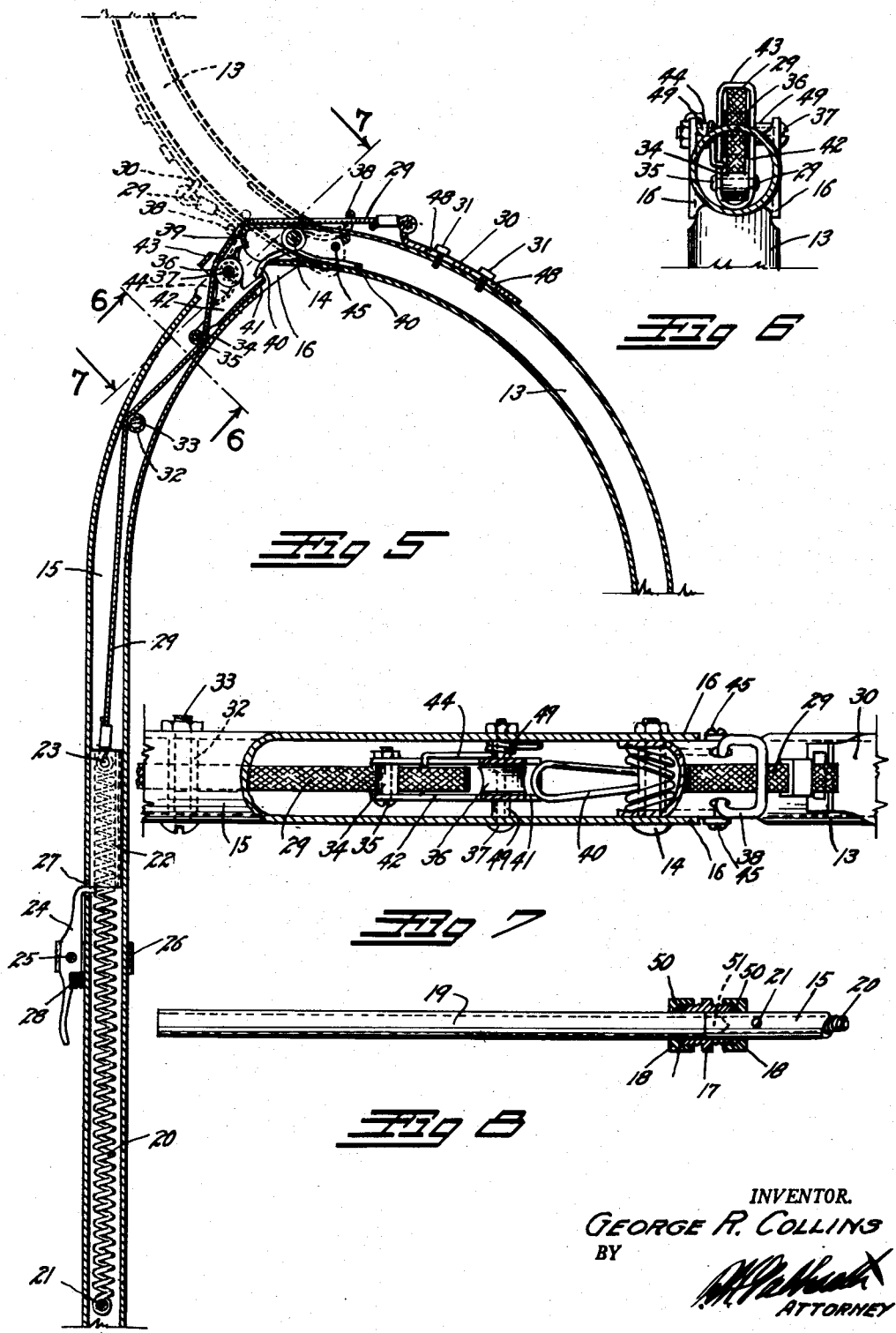

Patented July 21, 1953

2,645,874

UNITED STATES PATENT OFFICE 2,645,874

FISHERMAN'S LANDING NET

George R. Collins, Denver, Colo.

Application December 4, 1950, Serial No. 199,013

4 Claims. (Cl. 43—12)

This invention relates to a fisherman's landing net, and has for its principal object the provision of a sturdy and highly efficient landing net construction which will enable the net handle to be folded over the shoulder of the fisherman so that it will be resiliently held in place on the shoulder until ready for use, and which can be automatically extended to the fully open position by simply releasing a finger latch.

Another object of the invention is to provide a folding handle for a fisherman's landing net which can be opened out to the fully extended position or folded for shoulder carrying by the use of only one hand, so as not to interfere with the manipulation of the rod and reel with the other hand.

A further object of the invention is to provide a landing net construction whereby the net portion can be quickly and easily removed for storage or replacement purposes without the use of tools, and to provide an extension for the handle of a landing net which will materially increase the handle length when desired.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side view of the improved landing net in the extended, ready to use position;

Fig. 2 is a similar view, illustrating the net folded for carrying;

Fig. 3 is a plan view of the net extremity of the improved landing net;

Fig. 4 is a plan view of the handle extremity thereof;

Fig. 5 is an enlarged, longitudinal section through the handle, illustrating it in solid line in the folded position, and in broken line in the extended position;

Figs. 6 and 7 are still further enlarged, detail, sectional views through the improved net handle, taken on the lines 6—6 and 7—7, respectively, Fig. 5; and Fig. 8 is a fragmentary side view on the scale of Fig. 1, illustrating an extension handle member which may be applied to the handle of the improved landing net to increase the length thereof.

The improved fisherman's landing net employs a split circular net ring 10 formed by bending a wire or rod in a circular loop. The extremities of the rod are bent into radial parallel relation to form elongated hook portions 11 arranged to be received in a flattened forward extremity 12 formed on a curved forward handle portion or net tube 13. The extremities of the hook portions 11 are turned outwardly to engage in locking openings 47 in the sides of the net tube 13. The rear extremity of the net tube 13 is arcuately curved, rearwardly and downwardly to receive a hinge bolt 14.

A tubular handle member 15 is provided with a similar arcuately curved, forward extremity extending forwardly and downwardly to a hinged connection on the hinge bolt 14. The forward extremity of the handle member 15 is bifurcated and split to form two spaced-apart hinge tabs 16 which pass on opposite sides of the rear extremity of the net tube 13.

The rear extremity of the handle member 15 terminates in a clamping coupling 17 having clamping nuts 18. The coupling 17 is similar to that usually employed for connecting tubing together, such as used in electrical conduit tubing constructions, and is provided with wedge-shaped split clamping rings 50. The forward nut 18 clamps the coupling to the handle member 15. The rearward nut 18 clamps the coupling 17 to the front end of an extension handle tube 19, as shown in Fig. 8. The extension handle tube 19 is provided with a pointed plug 51 to facilitate its insertion in one end of the handle member 15.

The handle member 15 contains a helical tension spring 20 which is secured at its rear extremity to a spring pin 21 passing through the handle member 15 adjacent the rear extremity of the latter. The forward extremity of the spring 20 passes into a tubular sliding plunger 22, where it is secured on a connecting pin 23. The plunger 22 may be retained against rearward movement by means of a tilting latch 24 mounted on a latch pin 25 in a tubing clip 26 partially surrounding the handle member 15. The forward extremity of the latch 24 is hooked and extends through a perforation 27 in the handle member into engagement with the plunger 22. The rear extremity thereof forms a thumb lever which is constantly urged away from the handle member by means of a suitable compression spring 28.

It can be seen that when the plunger 22 is in the position of Fig. 5, pressure on the thumb lever extremity of the latch 24 will move the forward extremity thereof out of the path of the plunger 22, allowing the spring 20 to snap the plunger rearwardly. When the plunger is in the rearward position it is prevented from moving forwardly by the hooked extremity of the latch 24 engaging the forward extremity of the plunger 22.

A flexible member, such as a fabric or cord tape 29, extends from the connecting pin 23 in the plunger 22 to an adjustable bracket 30 which is secured on the net tube 13 by means of suitable screws 31. The screws 31 extend through slotted screw holes 48 in the bracket 30 to allow longitudinal movement of the bracket for adjusting the tension in the tape 29. In its passage to the bracket 30 the tape 29 passes over a rolling sleeve 32 mounted on a sleeve bolt 33. It then passes beneath a small roller 34 mounted on a roller pin 35 and over a roller 36 mounted on a roller bolt 37. Between the roller 36 and the bracket 30 the tape 29 passes beneath a bail loop 38 mounted adjacent the rearward extremity of the net tube 13. The rear extremity of the net tube 13 extends beyond the hinge bolt 14 and is rounded, as indicated at 39, and the tape 29 passes over this rounded extremity when the handle is in the folded position of Fig. 2, as shown in Fig. 5. The rolling sleeve 32 holds the tape out of frictional engagement with the wall of the handle member 15, and also positions the tape so that it will exert a lateral tension on the roller 34. The bail 38 acts as a hinge or bend point for the tape so as to maintain the tape against the roller 36 when the net tube is in the extended position.

It can be seen that if the handle is in the folded position of Fig. 5 and the latch 24 is released, the spring 20 will pull upon the tape 29, causing it to swing the rear extremity of the net tube 13 rearwardly and the forward extremity thereof forwardly to the broken line position of Fig. 5.

The net tube 13 is retained in the folded position (solid line position of Fig. 5) by means of a locking spring 40 which engages a locking tongue 41 on a rocking carriage 42. The locking spring 40 consists of a single length of relatively heavy spring wire formed in a U-shape and wrapped about the hinge bolt 14 so that one end will extend forwardly into the net tube 13, and its other will project from the rear extremity of the net tube 13 to be engaged by the locking tongue 41.

The rocking carriage 42 is tiltably mounted on the roller bolt 37 so that the tape 29 will initially act to pull the small roller 34 and its pin 35 upwardly to tilt the rear of the carriage 42 upwardly so as to swing the tongue 41 rearwardly from engagement with the locking spring 40 to allow the net tube 13 to swing to the extended position under the influence of the spring 20. The spring 40 serves an additional purpose in that when the handle is in the folded position of Fig. 2, the two portions thereof may be resiliently forced apart to fit them over the shoulder and body of the fisherman so that the two portions will be squeezed together by the action of the spring 40 to retain the landing net on the person of the fisherman with the handle member 15 pressing against his chest and the net loop 10 pressing against his back.

The upper part of the carriage 42 is arched over to form a guard 43 to retain the tape 29 on the roller 36. The rear extremity of the carriage 42 is constantly urged downwardly to project the tongue 41 by means of a wire spring 44 wrapped about the roller shaft 37.

It can be seen from the above that the improved landing net can be worn as a piece of apparel by the fisherman, with the handle portion 18 pressing closely against the chest and the net ring 10 pressing closely against his back under the action of the locking spring 40. In this position the net 46 is protected from entanglement with brush as the fisherman forces his way therethrough.

When the net is desired for use, it is only necessary for the fisherman to grip the handle member 15 and depress the latch 24. This will cause the spring 20 to instantly snap the net tube 13 to the position of Fig. 1, where it will be retained by the tension in the tape 29 and by the action of the latch 24 engaging the forward extremity of the plunger 22. To return the net to the folded position, it is only necessary to swing the net downwardly with a whipping motion while simultaneously releasing the latch 24 to cause the net to swing to the position of Fig. 2 under the inertia of the whipping action. The latch is then released to retain the handle in the folded position.

The outward movement of the portion 13 is limited by means of stop screws 45 mounted in the tube 13 so as to engage the hinge tabs 16 of the portion 15 at the fully opened position. The net 46 can be removed and replaced by simply squeezing the two extremities 11 together so as to release the hooked ends thereof from the locking holes 47.

If desired, the extension handle tube 19 may be reversed from the position shown in Fig. 8 so that the pointed plug 51 may be used as a non-slip point on the handle member 15. This enables the device to be used as a walking cane or pole to assist in supporting the fisherman in rapid, rocky streams.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A folding handle for a fisherman's landing net comprising: a handle member having a straight rearward portion and a curved forward extremity; a net tube having a straight forward portion and a similarly curved rear extremity; a hinge member securing the curved extremities of said handle member and said net tube together so that the straight portions of both may be folded into substantially parallel, spaced-apart relation or extended into substantial alignment with each other; a tension spring secured adjacent its rearward extremity to and within said handle member; a plunger slidably mounted in said handle member and secured to the forward extremity of said spring; latch means engaging and locking said plunger at either extremity of its travel; and a flexible member extending from said plunger through said handle member to said net tube which coacts with the spring to constantly urge the net tube to the extended position.

2. A fisherman's landing net construction as described in claim 1 having a tiltable locking member mounted in the forward extremity of said handle member in engagement with said flexible member to be tilted by the latter when the tension therein increases, and a locking spring mounted in the rearward extremity of said net tube to be engaged by said tiltable locking member for retaining said handle member and said net tube in the parallel relation.

3. A folding handle for a fisherman's landing net comprising: a handle member having a straight rearward portion and a curved forward extremity; a net tube having a straight forward portion and a similarly curved rear extremity; a landing net mounted on the forward extremity of the net tube; a hinge member securing the curved extremities of said handle member and said net tube together so that the straight portions of both may be folded into substantially parallel, spaced-apart relation to receive the shoulder of a fisherman therebetween or extended into substantial alignment with each other; a first resilient means acting when said handle member and said net tube are in alignment to resiliently hold them aligned; a second resilient means surrounding said hinge member and engaging one curved extremity; and latch means carried by the other curved extremity and positioned to engage said second resilient means when said handle member and said net tube are folded into parallel relation to resiliently urge the said handle member and said net tube toward each other to cause said second resilient means to clamp the shoulder therebetween.

4. A folding handle for a fisherman's landing net as described in claim 3 in which the second resilient means comprises: a locking spring coiled at its middle about said hinge member with its extremities extending oppositely outward, one extremity of said locking spring contacting said net tube to urge the latter toward said handle member, the other extremity of said locking spring projecting from said net tube; a tilting member in said handle member positioned to engage the projecting extremity of said spring when said handle member and said net tube are swung into parallel relation to cause said locking spring to resist movement of said handle member and said net tube away from each other; and means for tilting said tilting member to release it from said locking spring when desired.

GEORGE R. COLLINS.

References Cited in the file of this patent

UNITED STATES PATENTS

| Number | Name | Date |
| --- | --- | --- |
| 939,381 | Barnes | Nov. 9, 1909 |
| 985,114 | Covell | Feb. 21, 1911 |
| 1,596,810 | Cooney | Aug. 17, 1926 |
| 1,897,515 | Hedstrom | Feb. 14, 1933 |
| 1,921,323 | Purdon | Aug. 8, 1933 |
| 2,066,439 | Wine | Jan. 5, 1937 |
| 2,097,898 | Martin | Mar. 9, 1937 |
| 2,384,162 | Finn | Sept. 4, 1945 |
| 2,463,621 | Herzog | Mar. 8, 1949 |
| 2,472,572 | Dailey | June 7, 1949 |

FOREIGN PATENTS

| Number | Country | Date |
| --- | --- | --- |
| 605,066 | Great Britain | July 15, 1948 |
| 920,427 | France | Jan. 4, 1947 |